July 6, 1943.  P. WEATHERS  2,323,636
BOTTLE INSPECTION APPARATUS
Filed Sept. 30, 1939  3 Sheets-Sheet 1

Inventor
Paul Weathers
By
Attorney

July 6, 1943.   P. WEATHERS   2,323,636
BOTTLE INSPECTION APPARATUS
Filed Sept. 30, 1939   3 Sheets-Sheet 2

Inventor
Paul Weathers
By
Attorney

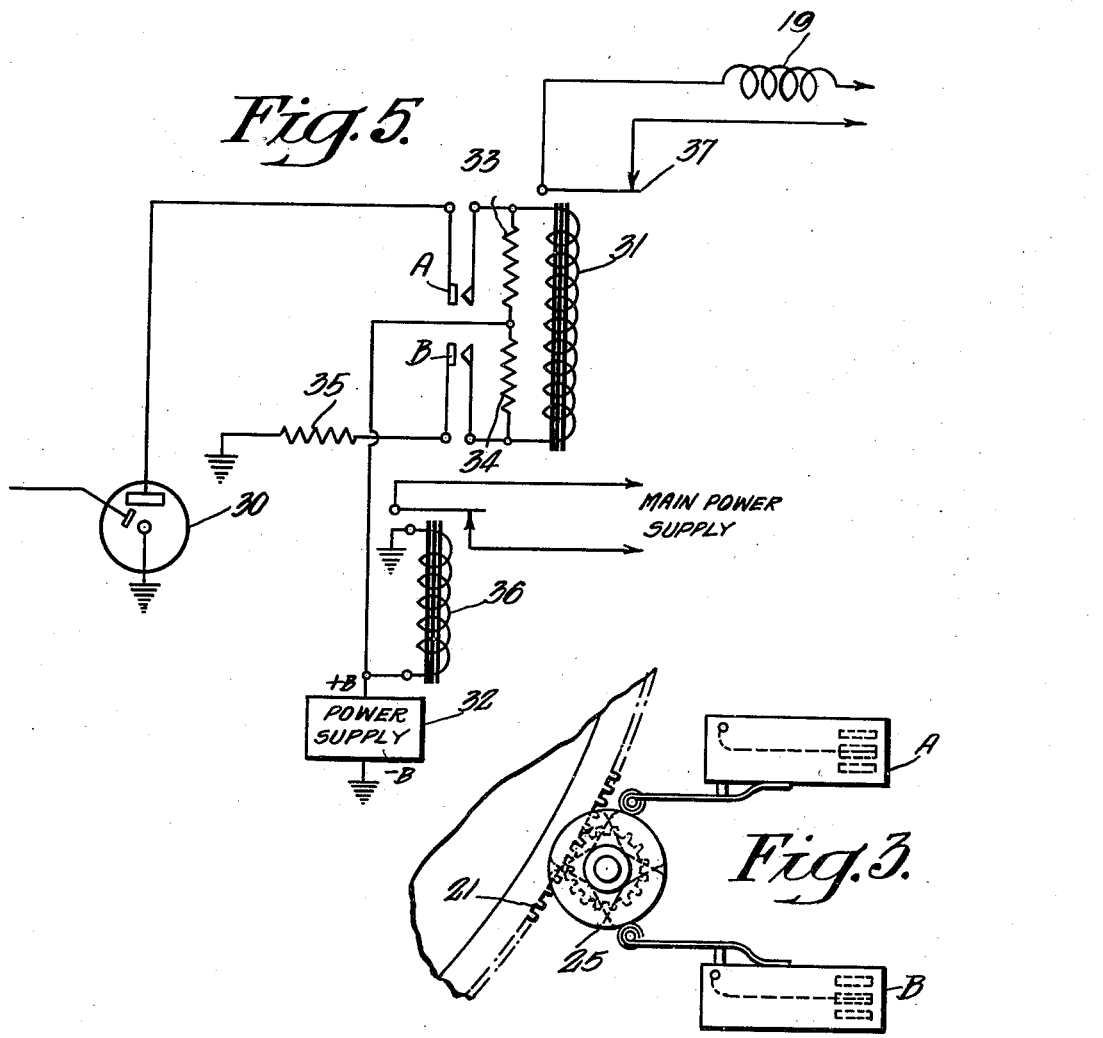

Patented July 6, 1943

2,323,636

UNITED STATES PATENT OFFICE 2,323,636

BOTTLE INSPECTION APPARATUS

Paul Weathers, Audubon, N. J., assignor to Radio Corporation of America, a corporation of Delaware Application September 30, 1939, Serial No. 297,217

11 Claims. (Cl. 250—41.5)

This invention relates to bottle inspection apparatus, and more particularly to a check circuit for such apparatus which will cause the apparatus to stop or to reject all of the bottles in case there should be any flaw in the functioning of any portion of the inspection mechanism, such as the amplifier, the inspection lamp, the optical system, or the power supply.

The apparatus is, in general, an improvement on the apparatus described and claimed in Stout Patent No. 2,132,447. The apparatus of the said patent causes the contents of the bottle to rotate by rotating the bottle and then stops the bottle during the inspection period, permitting the contents to rotate in a light beam which is impressed on a photoelectric cell. Impulses from the photoelectric cell are then passed through an amplifier, such, for example, as described and claimed in my Patent 2,192,568, issued March 5, 1940. If there is any foreign material mingled with the contents of the bottle, the amplifier trips an appropriate mechanism which causes the rejection of the bottle. In the present apparatus, the rejection of the bottle is also caused if there is any fault in the operation of the amplifier, optical system, light source, or other accessory mechanism, thereby positively preventing any bottle containing foreign material from passing through the apparatus if anything should go wrong with the apparatus.

One object of the invention is to provide an improved bottle inspection apparatus.

Another object of the invention is to provide a bottle inspection apparatus which will prevent the passage of any inadequately inspected bottle due to any flaw in the apparatus.

Another object of the invention is to provide an apparatus which will reject any bottles which have not been properly inspected.

Another object of the invention is to provide such an apparatus which will automatically stop the machine should the power supply to the amplifier fail.

Figure 1:
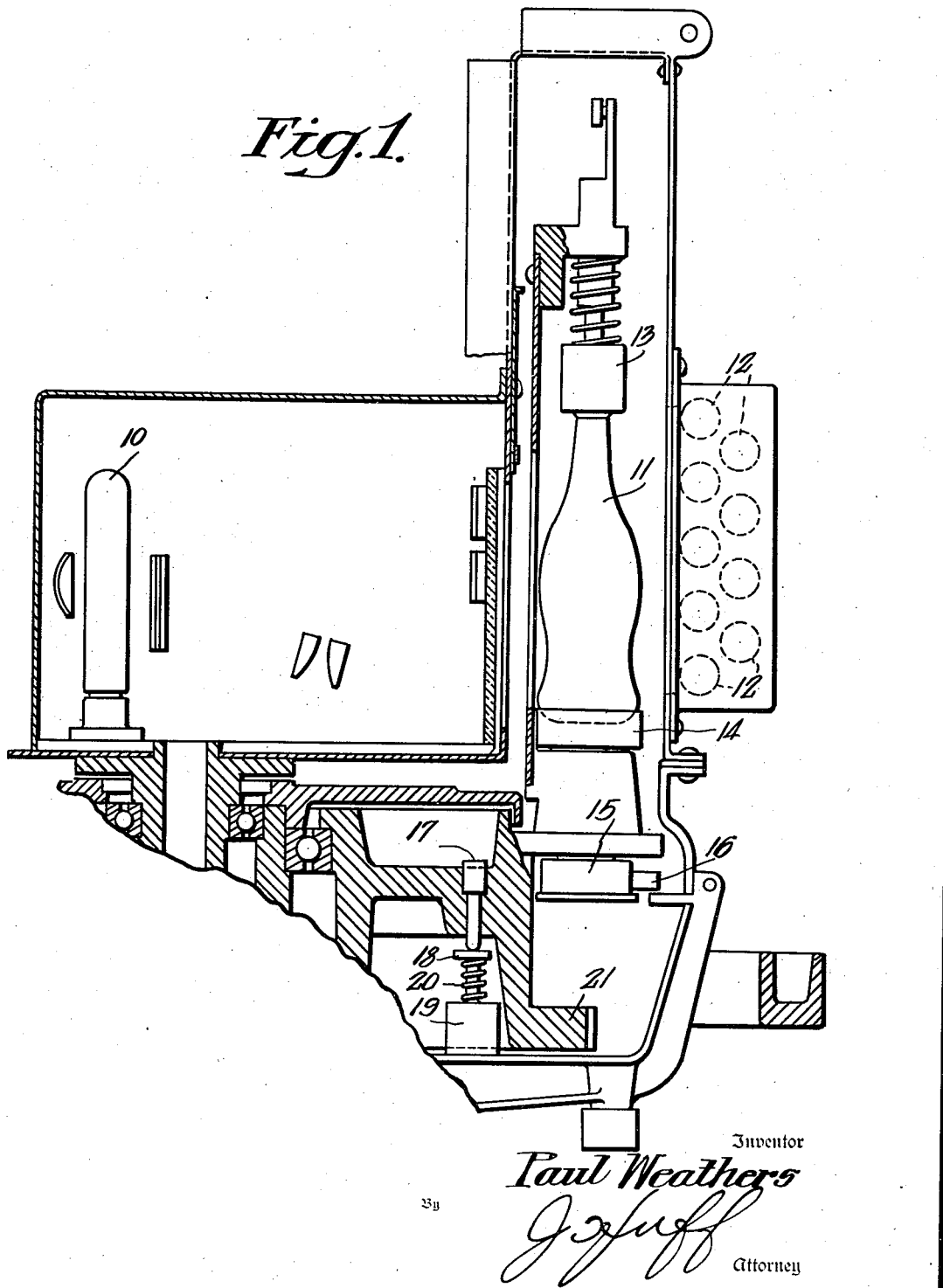
Figure 2:
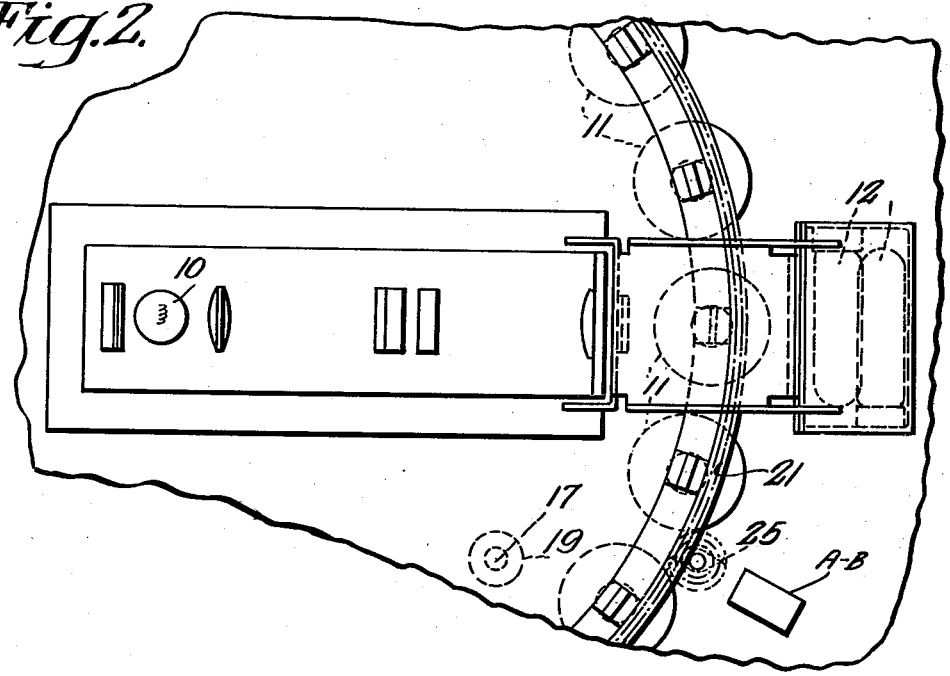
Figure 4:
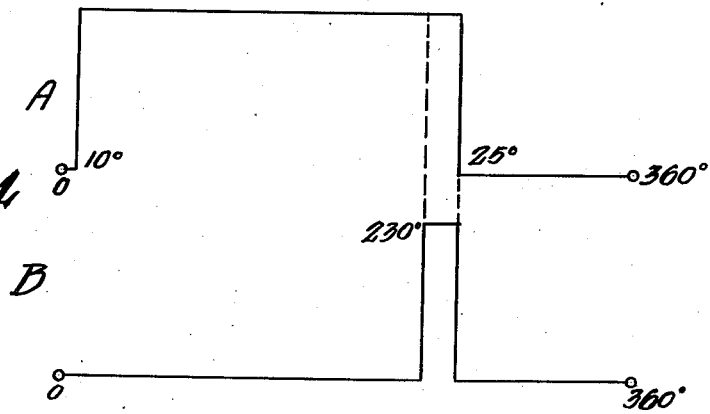

Other and incidental objects of the invention will be apparent to those skilled in the art from a reading of the following specification and an inspection of the accompanying drawings in which Figure 1 is a vertical sectional view through the apparatus at the inspection point, Figure 2 is a plan view, partly in section, through the apparatus at about the middle of Fig. 1, Figure 3 shows a detail of the cam switch mechanism, Figure 4 is a graph showing the cycle of operation of the switch mechanism of Figs. 3 and 5, and Figure 5 is a schematic diagram showing the connections of the switch of Fig. 3.

Referring first to Fig. 1, light from an appropriate source, such as the lamp 10, is directed to the bottle 11 by an appropriate optical system such, for example, as that shown in Sachtleben Patent 2,192,580, issued March 5, 1940, and this light, after passing through the bottle 11, reaches the bank of photocells 12 for which, if desired, a single photocell or a single push-pull photocell of the barrier layer type may be substituted.

The bottle 11 is held between a lower cup 14 and an upper cup 13 which maintain it accurately in position at the inspection point and, although the contents of the bottle have been previously caused to rotate by rotation of the bottle, the bottle is held stationary at the inspection point by the brake 16 applied to the pulley 15, which is connected to the lower cup 14.

If any foreign material in the bottle causes actuation of the protocells 12, then the impulse is transmitted through an appropriate amplifier mechanism such, for example, as that described in my aforesaid patent, and causes actuation of the reject pin 17. This reject pin 17 may be forced upward by a plunger 18. This plunger, however, is normally held in a downward position by the solenoid 19, through which current normally flows. If for any reason the current through the solenoid 19 ceases, the spring 20 forces the plunger 18 upward, thereby causing the reject pin 17 to project upwardly and causing the rejection of the corresponding bottle as described in the aforesaid Stout patent.

The entire turntable mechanism carrying the bottle 11 and the series of cups 13 and 14 is driven through a ring gear 21 which is further illustrated in Fig. 2.

This ring gear 21 has, in cooperative relation therewith, a cam switch 25 which is located in a predetermined angular relation to the position of the bottle inspection apparatus, as will be hereinafter described in more detail. The bottle inspection apparatus, including the light source 10, the photocells 12 and the attendant mechanism, swings in its entirety with the rotary carriage driven by the ring gear 21 during the inspection cycle; that is, a bottle reaches the predetermined point in its path and the inspection system moves with the bottle through a predetermined angular distance while the bottle is being inspected, being locked to the rotary carriage or turret during this period. At the end of the inspection cycle, the optical system is released and swings back to its original position, and the timing of the switch 25 is determined in relation to this sequence of operations.

An enlarged detail of the switch 25 is shown in Fig. 3 where the two contacting mechanisms thereof are indicated at A and B, respectively, each of these mechanisms being actuated by one of the adjustable cams.

The adjustment of the cams and the contacts A and B are shown in the double graph of Fig. 4, wherein the graph A shows the sequence of operations of the switch A while the graph B shows the sequence of operations of the switch B.

As shown in the graph A in Fig. 4, the switch A is open at the beginning of the inspection cycle and remains open during 10 degrees of the rotation of the cam member 25, thereby giving the optical system and bottle time to stop any vibration incident to the locking together of the inspection system and the rotary turret. At the end of the 10 degrees, switch A closes, remaining closed until the cam unit 25 has rotated through an angle of 250° from its starting point, when this switch is again permitted to open and remains open during the remainder of the cycle. As shown in the graph B connected to the graph A by dotted lines, the switch B remains open from the beginning of the cycle until the cam member has rotated 230°. The switch B then closes and remains closed through an angular rotation of 20° of the cam member 25 until it reaches 250° rotation from the starting point. As indicated in Fig. 4, this closing period of switch B coincides with the last 20° of the closing period of the switch A, which determines the inspection cycle, and switches A and B open coincidentally at the 250th degree, remaining open until the initiation of the next cycle.

Referring now to Fig. 5, which shows the schematic diagram of the connection of the aforesaid switches and their attendant mechanism, the switches A and B are schematically indicated by the corresponding reference letters. The tube 30 is the last tube of the amplifier described in my aforesaid application, but at present I prefer to use for this tube the type of cold cathode gas tube known commercially as the Radiotron OA4G. The member 31 is a relay shunted by the resistors 33 and 34 in series, from the center tap of which an appropriate lead goes to the positive side of the power supply unit 32, the negative side of which is grounded. The resistor 35 has a resistance equal to that of the tube 30 so that if current is flowing through the tube 30 and also through the resistor 35, these currents are equal. The relay 31 is provided with normally closed contacts 37 and if current flows through the coil 31, these contacts 37 open. The contacts 37 are connected in series with the solenoid 19 (Fig. 1) and its power supply so that if current flows through the winding 31 the contacts 37 will be opened, the solenoid 19 will be released and all bottles passing through the apparatus will be rejected until the condition is remedied.

Referring again to the cycle of operations of the switches A and B: While the bottle 11 with its rotating contents is being inspected, the relay A is closed and the relay B is open. If, therefore, any current flows through the tube 30, it will pass through the relay A and a portion will pass through the resistor 33 to the power supply. Another portion will pass through the relay 31 and the resistor 34 causing the relay contacts 37 to open and causing the rejection of the bottle. This result will be caused by the presence of any foreign material in the contents of the bottle. If there is no foreign material in the bottle undergoing inspection, the relay 37 remains closed and the bottle is carried around to its normal ejection position.

At the conclusion of the normal inspection of the bottle, that is, at the 230° point of the switch 25, the inspection system, including the photocells 12 and the attendant mechanism, starts to move back to its initial position. At this point the switch B is closed. The movement of the bottle relative to the optical system causes a signal to be impressed on the photocells 12 and therefore causes current to start to flow through the gas tube 30. Since the tube 30 is of the gas type, the current will continue to flow after it is started until the plate voltage is removed, independent of changes of the control grid potential. Therefore, at the 230° point, current will flow through the tube 30, and it will also tend to flow through the winding 31. However, since the contact B is closed an equal current will tend to flow through the resistor 35 and the resistor 34 and will tend to flow in the opposite direction through the winding 31 and the resistor 33. So long as these two currents tending to flow through the winding 31 are opposite, current will flow only through the resistors 33 and 34 and no effect will be produced on the relay 37. If, however, the current does not flow properly through the tube 30 due to any failure in the inspection apparatus such, for example, as failure of the lamp 10, failure of any tube in the amplifier, a broken wire or any trouble of like nature which prevents the amplifier, optical system, etc., from functioning properly, then current will flow only through the resistor 35 and not through the tube 30, and the contacts 37 will be opened, causing the bottle to be rejected. If the condition continues for the next bottle, that bottle will be rejected, etc., until the condition is remedied.

At the end of this test cycle, the current through the tube 30 is interrupted by the opening of the switch A at the 250° point and the apparatus returns to its original condition, ready for a repetition of the cycle. It will be apparent that failure of either of the resistors 33, 34 or 35 or either of the contacts A or B will cause current to flow through the relay 31, thereby protecting the apparatus, not only against failure of the apparatus itself, but also against failure of the check circuit just described. The only possibility of failure in the apparatus which would permit a bottle to pass without proper inspection lies in the simultaneous failure of both switches A and B during the 220° of the inspection cycle.

A relay 36 is shunted across the power supply to the amplifier and check circuit and this relay is connected in series with the motor driving the bottle-inspection machine. If for any reason this plate power supply 32 should fail, thereby causing simultaneous failing of both the amplifier and the check circuit, the motor of the machine is immediately stopped and no more bottles are inspected until the failure is remedied.

Inasmuch as the normal life of a switch such as that just described is approximately three years, while operating some twenty hours a day at a rate of inspection of the order of one hundred bottles per minute, it appears that the probability of the failure of only one of these switches on the inspection of any bottle, even with due allowance for the time the machine may not be operating during such a period, is only one in 15,000,000. In order to pass an uninspected bottle, it would be necessary for both the switches A and B to fail simultaneously during the 20° check period, which is one-eighteenth of the inspection cycle, thereby making the possibility of passing an uninspected bottle not more than 1 in $4\times10^{15}$.

I claim:

1. In combination with an electrical impulse responsive circuit, means connected to said circuit for actuation on occurrence of a predetermined condition in said circuit, means for causing the occurrence of said condition at predetermined time intervals for predetermined lengths of time, a balancing circuit connected to said actuated means in opposition to said first circuit, and means for closing said balancing circuit during said predetermined lengths of time.

2. In combination with an electrical impulse responsive circuit, means connected to said circuit for actuation on occurrence of a predetermined condition in said circuit, means for causing the occurrence of said condition at predetermined time intervals for predetermined lengths of time, a balancing circuit connected to said actuatable means in opposition to said first circuit, and means for closing said balancing circuit during said predetermined lengths of time, whereby if said impulse responsive circuit fails to operate during one of said predetermined lengths of time, the said actuatable means will be actuated.

3. In combination with an electrical impulse responsive circuit, means connected to said circuit for actuation on occurrence of a predetermined condition in said circuit, means for causing the occurrence of said condition at predetermined time intervals for predetermined lengths of time, a balancing circuit connected to said actuated means in opposition to said first circuit, and means for closing said balancing circuit during said predetermined lengths of time, and means connected to the power supply of both of said circuits for actuation on the failure of said power supply.

4. The combination of an amplifier provided with an output circuit, a device to be operated connected to said output circuit, and control means operable to render said device responsive during successive intervals of time to the flow of current in said circuit and to the absence of current in said circuit during each cycle of operation of a cyclic machine.

5. The combination of signal responsive means connected to the input circuit of an amplifier, a device to be operated connected to the output circuit of said amplifier, and control means rendering said device alternately responsive to the presence of a signal and the absence of a signal during each cycle of operation of a cyclic machine.

6. The combination of signal responsive means connected to the input circuit of an amplifier, a device to be operated connected to the output circuit of said amplifier, control means rendering said device alternately responsive to the presence of a signal and the absence of a signal, and means for applying a signal to said signal responsive means during the time the output device is responsive to the absence of a signal during each cycle of operation of a cyclic machine.

7. The combination of an amplifier provided with an output circuit, and an amplifier check circuit including means for periodically applying a check signal to said amplifier, a balancing circuit adapted to balance the check signal in the said output circuit, and means for connecting said balancing circuit to said output circuit during the introduction of said check signal.

8. The combination of an amplifier provided with an output circuit, and an amplifier check circuit including means for periodically applying a check signal to said amplifier, a balancing circuit adapted to balance the check signal in the said output circuit, means for connecting said balancing circuit to said output circuit during the introduction of said check signal, and means for restoring the amplifier and check circuit to their original condition.

9. An inspection device incluing means for alternately feeding objects to an inspection point and holding them at said point for inspection, electrical inspection means located adjacent said point and having an amplifier connected thereto, reject means operable by the output of said amplifier, and control means rendering said reject means operative alternately either in response to a signal from said inspection means during the inspection period or to the absence of a signal therefrom during the feed period.

10. In a photoelectric inspection device, an amplifier provided with an output circuit including means responsive to the current of said circuit, balancing means adapted to be connected to said circuit for rendering said output current means unresponsive to said current, means for producing a signal in said circuit at predetermined intervals, and switching means connected to said mechanism for connecting said balancing means in said output circuit during said intervals.

11. In electrical testing apparatus including means for producing an electrical impulse on the occurrence of a predetermined phenomenon, an electrical impulse responsive circuit connected to said means for actuation by said impulses, current responsive means connected to said circuit for actuation thereby when said circuit is actuated by an impulse, a balancing circuit adapted to be connected in opposition to said current responsive means for preventing operation thereof at predetermined times, means causing the actuation of said impulse-producing means at predetermined times independently of the occurrence of said phenomenon, and means for operatively connecting said balancing circuit during said independent actuation of said impulse producing means.

PAUL WEATHERS.